US012225176B2

(12) United States Patent
Cao et al.

(10) Patent No.: US 12,225,176 B2
(45) Date of Patent: Feb. 11, 2025

(54) FREE VIEWPOINT VIDEO GENERATION AND INTERACTION METHOD BASED ON DEEP CONVOLUTIONAL NEURAL NETWORK

(71) Applicant: NANJING UNIVERSITY, Jiangsu (CN)

(72) Inventors: Xun Cao, Jiangsu (CN); Zhihao Huang, Jiangsu (CN); Yanru Wang, Jiangsu (CN)

(73) Assignee: NANJING UNIVERSITY, Jiangsu (CN)

( * ) Notice: Subject to any disclaimer, the term of this patent is extended or adjusted under 35 U.S.C. 154(b) by 399 days.

(21) Appl. No.: 17/755,025

(22) PCT Filed: Oct. 28, 2020

(86) PCT No.: PCT/CN2020/124206
§ 371 (c)(1),
(2) Date: Apr. 19, 2022

(87) PCT Pub. No.: WO2021/093584
PCT Pub. Date: May 20, 2021

(65) Prior Publication Data
US 2022/0394226 A1    Dec. 8, 2022

(30) Foreign Application Priority Data

Nov. 13, 2019  (CN) .......................... 201911106557.2

(51) Int. Cl.
*G06T 9/00*      (2006.01)
*H04N 13/117*    (2018.01)
(Continued)

(52) U.S. Cl.
CPC ........... *H04N 13/117* (2018.05); *G06T 9/002* (2013.01); *H04N 13/246* (2018.05);
(Continued)

(58) Field of Classification Search
CPC .......... G06N 3/0464; G06N 3/02; G06N 3/08; G06N 20/00; G06T 2207/20081;
(Continued)

(56) References Cited

U.S. PATENT DOCUMENTS

2010/0026712 A1*  2/2010  Aliprandi ................ G06T 15/20
                                                    345/629
2018/0048810 A1*  2/2018  Matsushita .......... H04N 13/117
(Continued)

FOREIGN PATENT DOCUMENTS

| CN | 102447932 A | 5/2012 |
| CN | 105659592 A | 6/2016 |

(Continued)

OTHER PUBLICATIONS

Wang, Yanru et al.; "Interactive free-viewpoint video generation", Virtual Reality & Intelligent Hardware; vol. 2, No. 3; Jun. 30, 2020; pp. 247-260.

(Continued)

*Primary Examiner* — Henok Shiferaw
*Assistant Examiner* — Woo C Rhim
(74) *Attorney, Agent, or Firm* — NKL Law; Allen Xue

(57) ABSTRACT

A Free Viewpoint Video (FVV) generation and interaction method based on a deep Convolutional Neural Network (CNN) includes the steps of: acquiring multi-viewpoint data of a target scene by a synchronous shooting system with a multi-camera array arranged accordingly to obtain groups of synchronous video frame sequences from a plurality of viewpoints, and rectifying baselines of the sequences at pixel level in batches; extracting, by encoding and decoding network structures, features of each group of viewpoint images input into a designed and trained deep CNN model, to obtain deep feature information of the scene, and combining the information with the input images to generate a (Continued)

virtual viewpoint image between each group of adjacent physical viewpoints at every moment; and synthesizing all viewpoints into frames of the FVV based on time and spatial position of viewpoints by stitching matrices. The method does not require camera rectification and depth image calculation.

5 Claims, 5 Drawing Sheets

(51) Int. Cl.
    *H04N 13/246*     (2018.01)
    *H04N 13/257*     (2018.01)
    *H04N 13/296*     (2018.01)

(52) U.S. Cl.
    CPC ......... *H04N 13/257* (2018.05); *H04N 13/296* (2018.05); *G06T 2207/20081* (2013.01)

(58) Field of Classification Search
    CPC . G06T 2207/20084; G06T 2207/10016; G06T 15/20; G06T 2207/10028; G06T 17/00; G06T 7/70; G06T 7/579; G06T 3/4038; G06T 15/08; G06T 2207/20221; G06T 2207/30244; G06T 5/60; G06T 2200/32; G06T 9/002; G06V 10/82; H04N 13/111; H04N 2013/0081; H04N 13/282; H04N 13/117; H04N 21/21805; H04N 13/221; H04N 23/90; H04N 13/279; H04N 13/246; H04N 13/257; H04N 13/296; H04N 13/239; H04N 23/60
    See application file for complete search history.

(56) References Cited

U.S. PATENT DOCUMENTS

| | | | | |
|---|---|---|---|---|
| 2018/0182114 A1* | 6/2018 | Hanamoto | ................ | G06T 3/04 |
| 2018/0220125 A1* | 8/2018 | Tamir | ...................... | G06T 17/00 |
| 2019/0014301 A1* | 1/2019 | Ota | ......................... | G06T 7/564 |
| 2019/0068955 A1* | 2/2019 | Nakazato | ............. | H04N 13/117 |
| 2019/0174109 A1* | 6/2019 | Yoshikawa | .......... | H04N 13/243 |
| 2019/0174122 A1 | 6/2019 | Besley | | |
| 2019/0244379 A1* | 8/2019 | Venkataraman | .......... | G06T 7/70 |
| 2019/0356906 A1* | 11/2019 | Handa | .................. | H04N 13/117 |
| 2020/0120324 A1* | 4/2020 | Kwong | ................ | H04N 13/111 |
| 2020/0234495 A1* | 7/2020 | Nakao | ................. | A63F 13/5258 |
| 2020/0258196 A1* | 8/2020 | Kokura | ................. | G06T 3/4076 |
| 2020/0329189 A1* | 10/2020 | Tanaka | .................... | G06T 17/20 |
| 2020/0336719 A1* | 10/2020 | Morisawa | ............. | H04N 13/239 |
| 2020/0372691 A1* | 11/2020 | Ito | .......................... | G06T 15/205 |
| 2020/0380720 A1* | 12/2020 | Dixit | ......................... | G06T 7/50 |
| 2020/0387288 A1* | 12/2020 | Ito | ........................ | H04N 21/431 |
| 2021/0120218 A1* | 4/2021 | Himukashi | ........ | H04N 21/2668 |
| 2021/0134058 A1* | 5/2021 | Ito | ............................ | G06T 7/194 |
| 2021/0334935 A1* | 10/2021 | Grigoriev | ................ | G06N 3/08 |
| 2022/0130056 A1* | 4/2022 | Zhang | ..................... | G06T 7/251 |

FOREIGN PATENT DOCUMENTS

| | | | | |
|---|---|---|---|---|
| CN | 107396133 A | | 11/2017 | |
| CN | 107545586 A | | 1/2018 | |
| CN | 107493465 B | | 6/2019 | |
| CN | 110113593 A | | 8/2019 | |
| CN | 110223382 A | * | 9/2019 | ......... G06F 17/5009 |
| CN | 110443874 A | | 11/2019 | |
| CN | 110798673 A | | 2/2020 | |
| WO | 2018147329 A1 | | 8/2018 | |

OTHER PUBLICATIONS

Deng, Bao-Song et al.; "Wide Baseline Matching based on Affirre Iterative Method"; Signal Processing; vol. 23, No. 6; Dec. 31, 2007; pp. 823-828.

Bosc, Emilie et al.; "Towards a New Quality Metric for 3-D Synthesized View Assessment", IEEE Journal of Selected Topics in Signal Processing; vol. 5, No. 7; Sep. 26, 2011; All.

* cited by examiner

FREE VIEWPOINT VIDEO GENERATION AND INTERACTION METHOD BASED ON DEEP CONVOLUTIONAL NEURAL NETWORK

TECHNICAL FIELD OF THE INVENTION

The present invention relates to the field of computer vision, mainly to a generation and interaction method of virtual viewpoints in a Free Viewpoint Video (FVV).

BACKGROUND OF THE INVENTION

In the traditional TV relay, the program director shoots a video program from a limited number of viewpoints and relays the program to viewers, and the video information is output and acquired unidirectionally, so the viewers can only watch the video from specific viewpoints given by the program director. Moreover, due to the limited number of cameras in most program shot scenes, frame skipping of video images will occur when the program director actively switches the viewpoints, thus bring viewers less than ideal viewing experience. To solve the passive video viewing experience, Free Viewpoint Video (FVV) technology has been developed rapidly in recent years with the improvement of video capture devices and the rapid improvement of computing power, and interactive video viewing is becoming the development trend of a new generation of new media.

In the TV relay of typical stage scenes such as sports events, a broadcaster will set up as many cameras as possible to capture from as many viewpoints as possible. As the number of cameras increases, viewpoints will be switched more smoothly, but the pressure of data transmission will also increase linearly, so virtual viewpoint generation technology was born to achieve the smoothest possible viewpoint switching effect under the conditions of the controllable number of cameras. This technology can be used to generate virtual viewpoints between the physical viewpoints captured by the camera, thus shifting the pressure of data transmission from the physical capture terminals to a local server or cloud server with high computing power. Therefore, generating better quality virtual viewpoints with the lowest possible computational effort has become the core of FVV-related technologies.

Now some existing virtual viewpoint generation technologies generate viewpoints by rendering traditional depth and parallax images, such as a method in the patent CN102447932A, which includes following steps of calculating a depth image of a shot scene using pre-rectified internal and external parameters of a camera, mapping pixels in a corresponding reference image to the corresponding 3D space using depth information in the depth image, correspondingly converting the pixels in the reference image in the 3D space to a virtual camera position using translation parameters and the internal parameters of the camera, and finally displaying images on the plane of the virtual camera, i.e., virtual viewpoint images. This method is computationally intensive because of a need to traverse all pixels of the images, and the rendering efficiency increases exponentially with the increase of image resolution and the number of cameras. Moreover, this virtual viewpoint generation method needs to rectify the cameras in advance, and the difficulty and precision of camera rectification will be greatly affected in the TV relay of large scenes such as sports events, resulting in the degraded quality of synthesized virtual viewpoints.

Currently, deep learning in the field of virtual viewpoint generation is mostly carried out in the field of Video Frame Interpolation, where some of these networks predict and generate virtual viewpoints by a deep network with a specific structure based on the information related to optical flow between adjacent frames of a video as well as physical viewpoint images in a dataset. If these networks for Video Frame Interpolation are used directly in the field of multi-viewpoint shooting of large scenes, a large area of artifacts will be produced due to the wide baseline and large displacement of adjacent physical viewpoints.

SUMMARY OF THE INVENTION

An objective of the present invention is to provide a generation and interaction method of virtual viewpoints in a Free Viewpoint Video (FVV) based on a deep CNN network, to improve the quality of virtual viewpoints and reduce the computational effort.

A technical solution employed in the present invention is follows.

A Free Viewpoint Video (FVV) generation and interaction method based on a deep convolutional neural network is provided, including following steps of:

a step (1) of rectifying the pose and color of cameras in an acquisition system the acquisition system includes N cameras in uniform and circular arc-shaped arrangement at the same height; the pose and position of the cameras are rectified based on a reference object at the center of the circular arc, and the position of each camera remains unchanged after rectification; and color parameters of the N cameras are rectified by a white balance algorithm based on Gray World;

a step (2) of shooting a target scene object in synchronous video sequences by the camera array of the acquisition system, and selecting video frames at a certain moment to rectify baselines of N−1 groups of adjacent viewpoints in sequence, to obtain N−1 image affine transformation matrices $M_i$, i=1, 2, . . . , n;

a step (3) of rectifying baselines of all frame data of adjacent sub-viewpoints in sequence by the obtained affine transformation matrices $M_i$;

a step (4) of pre-processing binocular datasets through baseline rectification, color rectification based on the Gray World algorithm, displacement threshold screening based on optical flow calculation, and then training the virtual viewpoint generation ability of the deep CNN;

a step (5) of inputting the baseline data rectified in the step (3) into the deep CNN pre-trained in the step (4), and outputting generated virtual viewpoint 2D images based on the number of reconstructed virtual viewpoints;

a step (6) of stitching the matrices of the physical viewpoints and the virtual viewpoints generated in sequence of physical space positions, and labeling Block_Index of all viewpoints in the image matrix in sequence;

and a step (7) of synthesizing the stitched frames at every moment obtained in the step (6) into an FVV at a shooting frame rate of multiple cameras.

Compared with the prior art, the beneficial effects of the present invention are as follows.

(1) Unlike traditional geometric methods based on depth and parallax, the method in the present invention rectifies baselines of the sequences of the shot FVV at pixel level, and predicts and generates virtual viewpoints by the deep CNN without rectifying multiple cameras in advance, which solves the problem of low precision and difficulty in multi-camera rectification in large scenes, reduces the computational effort and improves the efficiency of virtual viewpoint generation.

(2) According to the present invention, the binocular vision datasets are pre-processed through baseline rectification, color rectification, displacement threshold screening based on optical flow calculation in the process of training the deep CNN, and the virtual viewpoints are synthesized in better effect in case of wide baseline and large displacement of adjacent viewpoints and can eliminate the large area of artifacts to some extent.

DETAILED DESCRIPTION OF THE INVENTION

The present invention will be described in detail below with reference to the accompanying drawings by embodiments.

Figure 1:
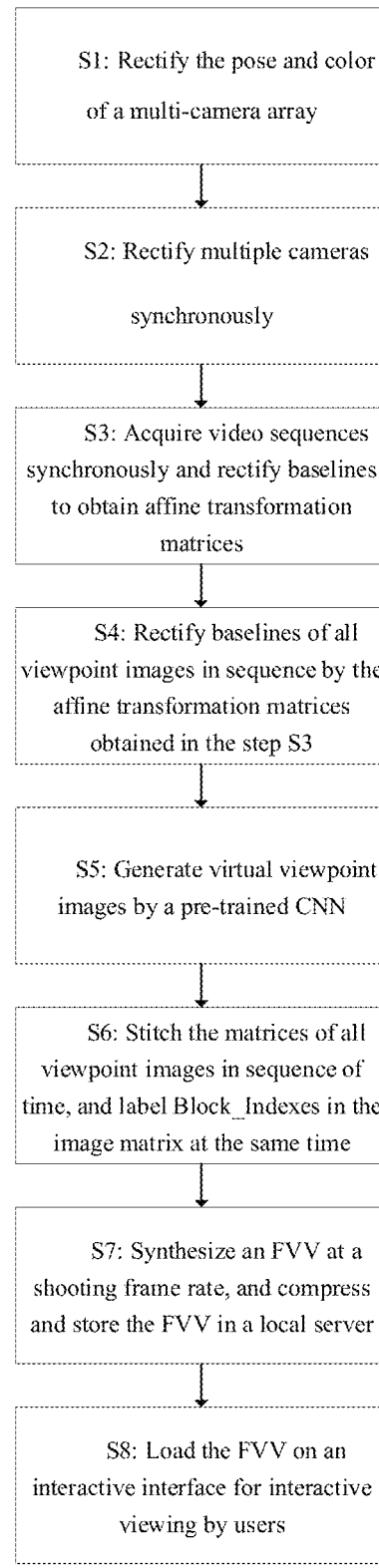
FIG. 1 is a flow chart of a method according to the present invention.
Figure 2:
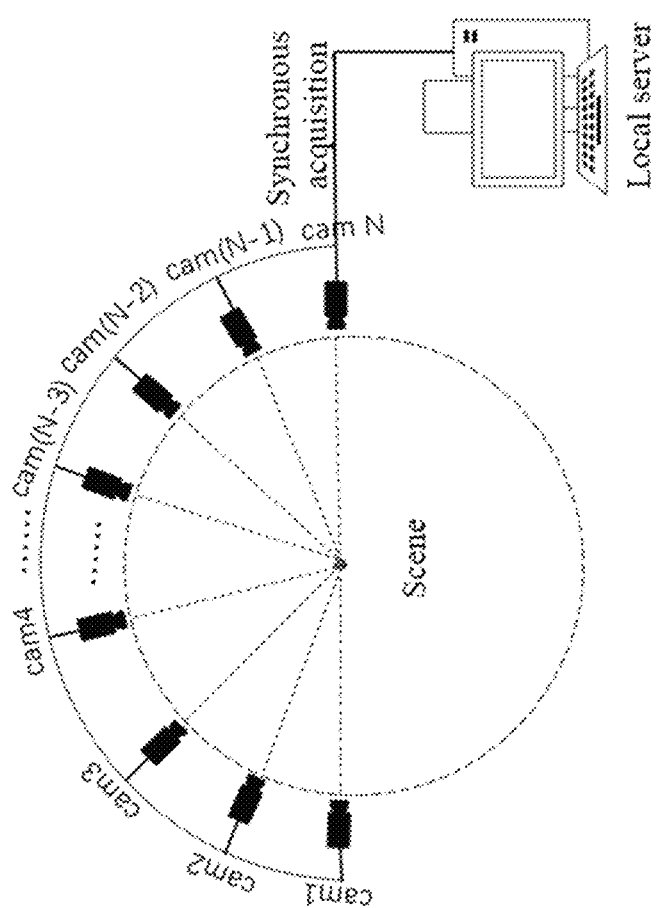
FIG. 2 is a topology of a hardware acquisition system according to an embodiment of the present invention.

In this embodiment, a multi-camera array as shown in a topology of FIG. 1 is arranged in a program stage scene to synchronously acquire video sequence information of the scene, and a series of data are processed and synthesized into an interactive Free Viewpoint Video (FVV), which can be viewed interactively by users through an interactive freeview interactive display system developed accordingly, making it possible to transmit relayed information bidirectionally.

A processing flow of this embodiment is shown in FIG. 1, including the following steps.

Figure 3:
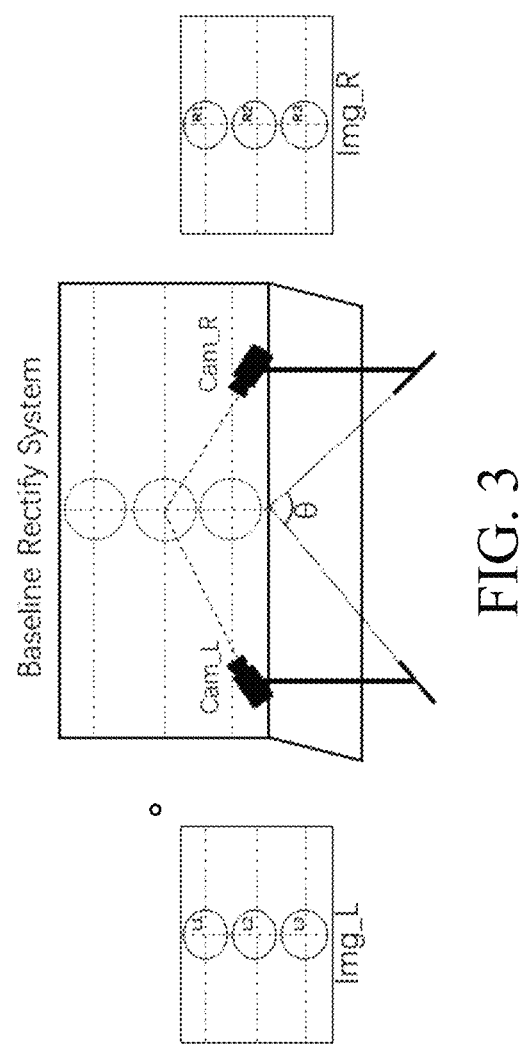
FIG. 3 is a schematic diagram of a baseline rectification method according to the embodiment of the present invention.

(1) Circular Arc-Shaped Arrangement of a Camera Array, and Pose and Color Rectification of Multiple Cameras The topology of a hardware acquisition system is shown in FIG. 1. There are N cameras in uniform and circular arc-shaped arrangement at the same height, and an angle between optical axes of adjacent cameras is controlled at about 30 degrees. A horizontal and vertical "cross-shaped" reference object is placed at the center of the scene to rectify the pose and position of the cameras. As shown in FIG. 3, a vertical and horizontal plate is placed at the center of the scene, so centers of all cameras are directed at a center O of the reference plate, while the vertical direction in the middle of a camera image coincides with a vertical reference line of the reference plate, and the position of each camera remains unchanged after rectification. At the same time, the color parameters of the N cameras are rectified by a white balance algorithm based on Gray World.

(2) Synchronous Rectification of Multiple Cameras

All cameras are synchronized by an external trigger signal generator through video data trigger lines, and the frequency of trigger signals is adjusted to trigger all cameras to synchronously acquire information of a shot scene.

(3) Simultaneous Acquisition of Video Sequences and Baseline Rectification to Obtain Affine Transformation Matrices The camera array arranged in the step (1) is configured to shoot a target scene object in synchronous video sequences, video frames at a certain moment are selected to rectify baselines of N−1 groups of adjacent viewpoints in sequence, and a translation factor (x,y), a rotation factor θ and a scaling factor k in affine transformation are manually set based on feature points of the object in the scene, so that the feature points at the center of the scene are located at a position where the reference object is, such as a central rectification point of the scene at a point O in a schematic diagram of a baseline rectify system used in this embodiment (shown in FIG. 3), where Cam_L and Cam_R represent an object at the center of the scene shot simultaneously by the left and right cameras with the same parameters, and three obtained feature points of the object in left and right images Img_L and Img_R coincide with L1, L2, L3, R1, R2 and R3 at the same time, thus ensuring that the baselines of the left and right cameras are on the same level. Therefore, this method can rectify baselines. N−1 image affine transformation matrices are obtained by the above baseline rectification method $M_i$ (i=1, 2, . . . , n). The specific form of the affine transformation matrix is $$M = \begin{pmatrix} \alpha & \beta & (1-\alpha) \cdot x - \beta \cdot y \\ -\beta & \alpha & \beta \cdot x + (1-\alpha) \cdot y \end{pmatrix}_{2 \times 3},$$

where $\alpha = k \cdot \cos(\theta)$, $\beta = k \cdot \sin(\theta)$.

(4) Batch Baseline Rectification

The baselines of all frame data of adjacent sub-viewpoints are rectified in sequence by the obtained affine transformation matrices $M_i$ through the warpAffine( ) function in OpenCV, and the baselines of N−1 groups of cameras are rectified in pairs by the affine matrices $M_i$ (i=1, 2, . . . , n) obtained in the step (3) sequentially according to the spatial positions of N cameras in circular arc-shaped arrangement, so that the rectified image baselines of the N cameras are all kept at the same level.

(5) Virtual Viewpoint Generation Network Training

This step starts with pre-processing datasets through baseline rectification, color rectification, and displacement threshold screening based on optical flow calculation. Each dataset consists of image triplets of multiple 'left center right' viewpoints in many scenes, and baselines of the image triplets of each image are first rectified in batches by the method the same as that in the step (3), so that several groups of feature points in every three images are kept at the same level. Color rectification is performed by the white balance algorithm based on Gray World so that three images of the same scene have the same white balance parameters. Finally, optical flow diagrams of the triplets are calculated in pairs to obtain average pixel displacement of the same object in the same scene, and a threshold is set to screen the triplets exceeding the threshold to form a new training dataset.

Figure 4:
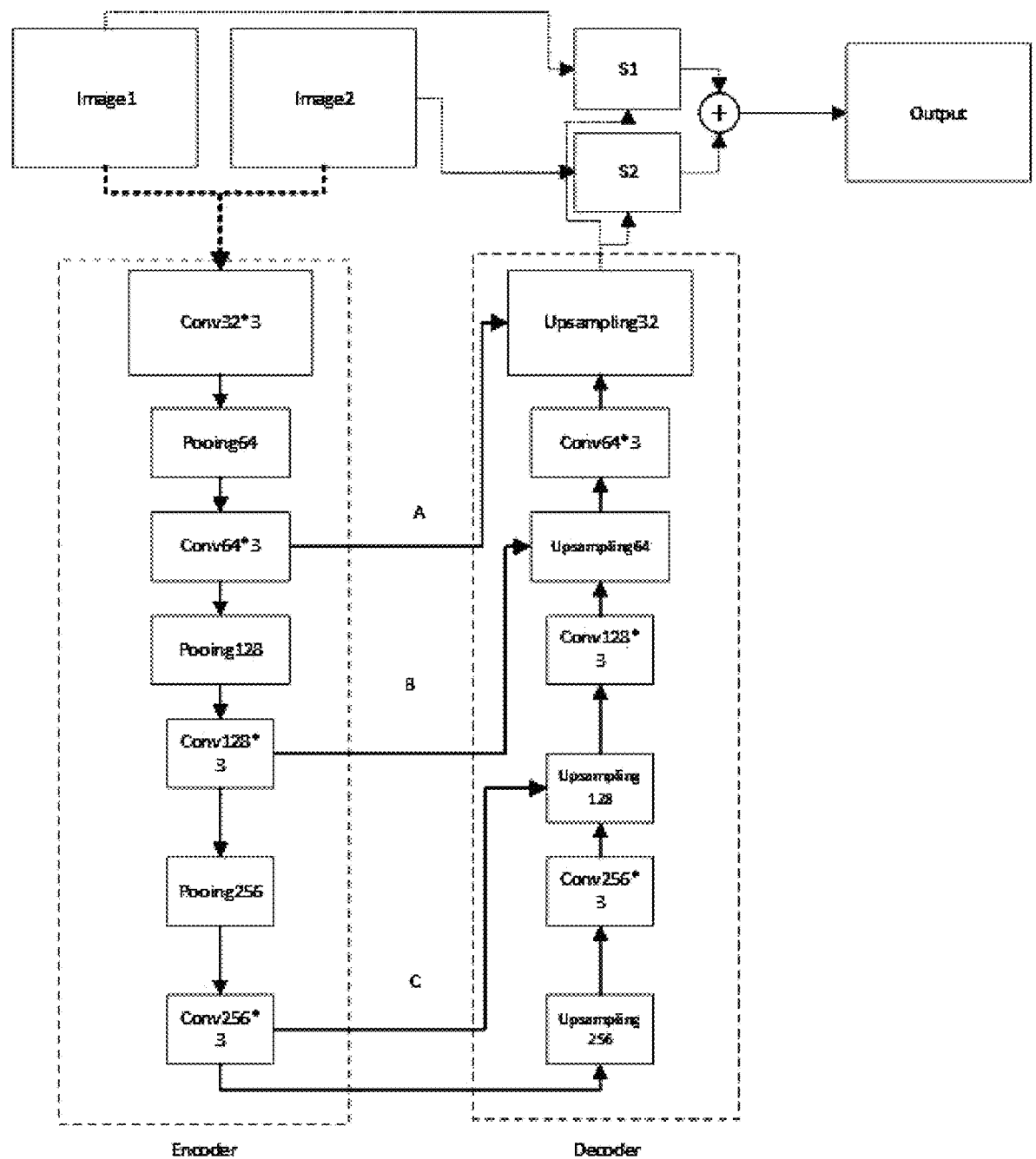
FIG. 4 is a flow chart of a deep CNN according to the embodiment of the present invention.

The structure of the deep CNN used in this embodiment is based on an open-source network SepConv, as shown in FIG. 4 (refer to the Video Frame Interpolation via Adaptive Separate Convolution for details), which specifically includes an encoding network and a decoding network (as shown by two sub-network blocks Encoder and Decoder in the two dashed boxes in FIG. 4). The Image1 and Image2 from the left and right viewpoints pass through the coding network and decoding network in sequence, which pass through convolutional layers (Conv) and average Pooling layers (Pooling) of various sizes as shown in FIG. 4 in sequence in the encoding network, and pass through convolutional layers (Upconv) and linear upsampling layers (upsampling) of various sizes as shown in FIG. 4 in sequence in the decoding network, to obtain deep feature mapping parameters S1 and S2 of the scene, respectively, and the parameters are cascaded and added with the input images Image1 and Image2, respectively, to predict a 2D image Output of a virtual viewpoint between left and right physical viewpoints. In the process of training this network, the training results are quantified using the difference between the Output and an intermediate image of the triplet in the dataset as Ground Truth, and the following two forms of loss functions are adopted respectively:

$$L_1=\|R-R_{GT}\|_2^2,\ L_2=\|S(R)-S(R_{GT})\|_2^2$$

$L_{total}=L_1+\alpha\cdot L_2$, where $L_1$ is a 2-norm error between the network predicted image and the Ground Truth based on the pixel RGB difference, $L_2$ is the difference in a feature structure extracted by the network, and the function S( ) is a feature extraction loss function for training a network model to perceive a deep special structure in the scene. The total loss function $L_{total}$ for training is a linear weighted sum of $L_1$ and $L_2$. An optimal parameter model of a Virtual View Generation Network (VVGN) is obtained by iterative training for a certain period.

(6) Virtual Viewpoint Generation

The baseline data rectified in the step (4) are input into a pre-trained deep Virtual View Generation Network (VVGN), and generated virtual viewpoint 2D images are output based on the number of reconstructed virtual viewpoints. Unlike traditional virtual viewpoint generation methods, the method in the present invention predicts and generates a virtual viewpoint between two physical viewpoints based on the deep CNN, inputs data for baseline rectification at pixel level in advance, and inputs feature structures of the two viewpoints directly through CNN learning to output the results without rectifying multiple cameras in advance. Through this step, the effect of generated virtual viewpoints is determined. The binocular datasets are pre-processed through baseline rectification, color rectification, displacement threshold screening based on optical flow calculation in the step (5), and input into the CNN as shown in FIG. 4 for training. The data input for training are two binocular 2D images, and the training loss functions are:

$$L_1=\|R-R_{GT}\|_2^2,\ L_2=\|S(R)-S(R_{GT})\|_2^2,$$

$L_{total}=L_1+\alpha\cdot L_2$, where $L_1$ is a 2-norm error between the network predicted image and the Ground Truth based on the pixel RGB difference, $L_2$ is the difference in a feature structure extracted by the network, and the function S( ) is a feature extraction loss function for training a network model to perceive a deep special structure in the scene. The total loss function $L_{total}$ for training is a linear weighted sum of $L_1$ and $L_2$. In case of binocular wide baselines, better virtual viewpoint quality may be obtained compared with existing deep learning-based video interpolation networks; and the computational effort is much lower compared with traditional methods.

(7) Stitching Matrices of all Viewpoint Image Frames

The matrices of the physical viewpoints and the virtual viewpoints generated in the step (6) are stitched in sequence of physical space positions (the number of rows and columns of each matrix depends on the number of virtual viewpoints generated), and Block_Index of all viewpoints in the image matrix are labeled in sequence with a default of row.

(8) FVV Synthesis

The stitched frames at every moment obtained in the previous step are synthesized into an FVV using a cv2.VideoWriter( ) function in FFmpeg or OpenCV at a shooting frame rate of multiple cameras, and the FVV is compressed and stored in a local server at a certain compression ratio.

(9) Interactive Viewing of FVV by Users

Figure 5:
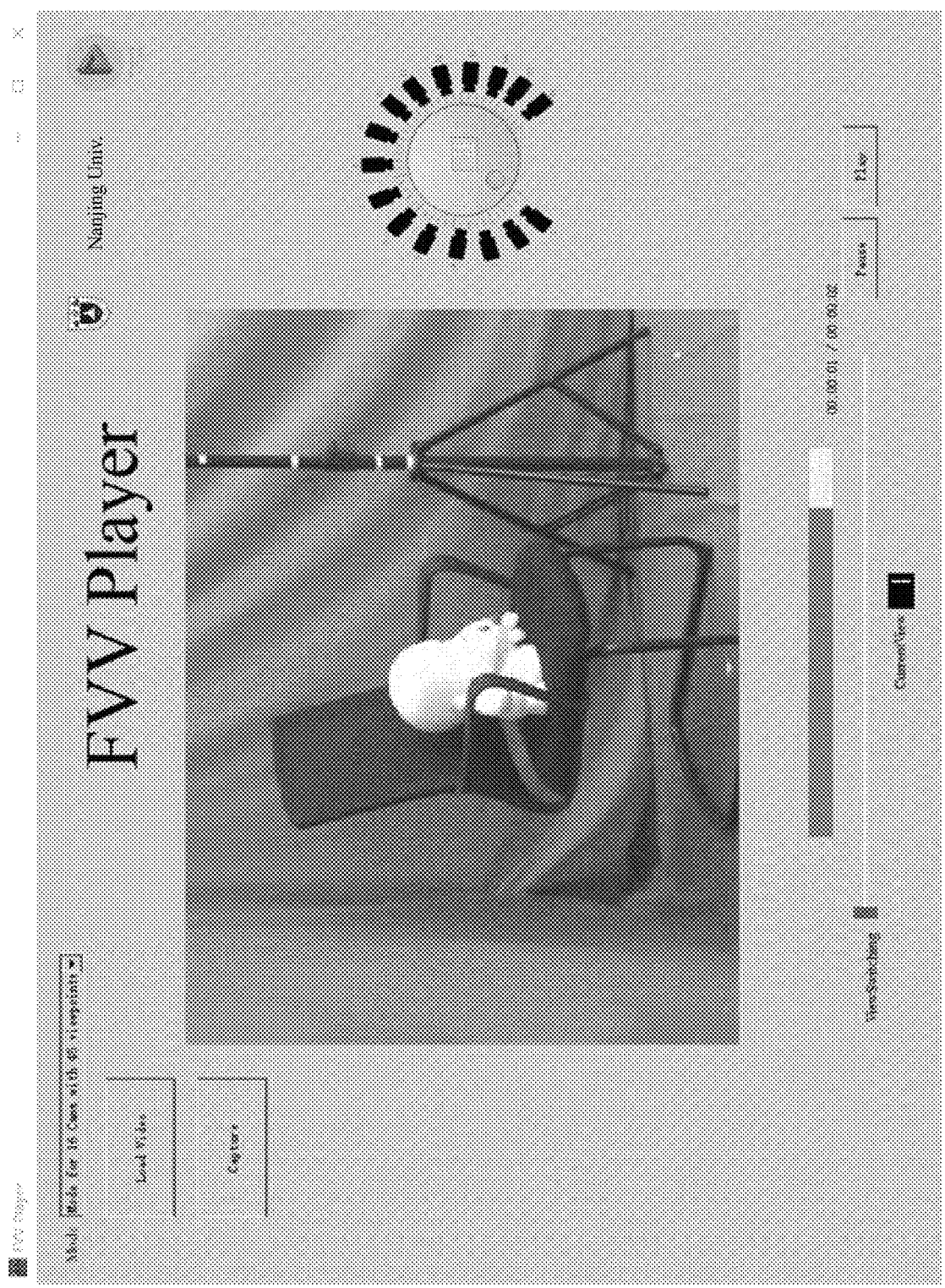
FIG. 5 is an interface of an FVV Player according to the embodiment of the present invention.

The interface of an FVV Player is shown in FIG. 5. After the free-view video (FVV) synthesized in the step (8) is loaded, users can smoothly switch the FVV to video blocks from different viewpoints corresponding to a specific viewpoint Block_Index using a Slider or Dial interactive button module in real time, thus realizing the free and interactive viewing experience for users.

The invention claimed is:

1. A Free Viewpoint Video (FVV) generation and interaction method based on a deep Convolutional Neural Network (CNN), comprising:
    S1: rectifying a pose and a color of each camera in an array of N camera in an acquisition system, wherein the array of N cameras disposed uniformly about a circular arc at a same height, the pose of each camera is rectified based on a reference object at a center of the circular arc, and the position of each camera remains unchanged after rectification; and the color of each camera is rectified by a white balance algorithm based on Gray World;
    S2: shooting a target scene object in synchronous video sequences by the array of N cameras, and selecting video frames at a certain moment to rectify baselines of N−1 groups of adjacent viewpoints in sequence, to obtain N−1 image affine transformation matrices $M_i$, i=1,2, . . . ,n;
    S3: rectifying a baseline of each frame data of N−1 groups of adjacent sub-viewpoints in sequence using the affine transformation matrices $M_i$;
    S4: pre-processing binocular datasets through the baseline rectification according to S3, the color rectification according to S1, and a displacement threshold screening based on an optical flow calculation, and then training a virtual viewpoint generation ability of the deep CNN;
    S5: inputting data of the baseline rectified in S3 into the deep CNN trained in S4, and outputting 2D images of virtual viewpoints based on a number of reconstructed virtual viewpoints;
    S6: constructing an image matrix by stitching together physical viewpoints and the virtual viewpoints in sequence according to positions thereof in a physical space, and labeling Block_Indexes of all viewpoints in the image matrix in sequence; and
    S7: synthesizing the stitched image matrix obtained in S6 into an FVV at a shooting frame rate of the array of N cameras.

2. The FVV generation and interaction method based on a deep CNN according to claim 1, wherein, in S1, a reference plate having a center crossed by a horizontal reference line and a vertical reference line is placed at the center of the circular arc, a center of each camera is directed at the center of the reference object, while a vertical direction in the middle of a camera image coincides with the vertical reference line of the reference plate, and the position of each camera remains unchanged after rectification.

3. The FVV generation and interaction method based on a deep CNN according to claim 1, wherein, in S1, an angle between optical axes of two adjacent cameras in the array of N cameras is at about 30 degrees.

4. The FVV generation and interaction method based on a deep CNN according to claim 1, further comprising compressing and storing the FVV in a local server.

5. The FVV generation and interaction method based on a deep CNN according to claim 4, further comprising switching the FVV synthesized in S7 to video blocks from different viewpoints in real time based on the viewpoint Block Indexes of S6.

* * * * *